United States Patent [19]
Jason

[11] 3,810,389
[45] May 14, 1974

[54] HYGROMETERS

[75] Inventor: Alfred Charles Jason, Aberdeen, Scotland

[73] Assignee: National Research Development Corporation, London, England

[22] Filed: May 3, 1972

[21] Appl. No.: 249,793

[30] Foreign Application Priority Data
May 4, 1971 Great Britain.................... 12837/71

[52] U.S. Cl.................................. 73/336.5, 338/35
[51] Int. Cl. ............................................ G01n 25/56
[58] Field of Search.................. 73/336.5, 29, 17 A; 338/35; 73/64.2

[56] References Cited
UNITED STATES PATENTS

| | | | |
|---|---|---|---|
| 3,664,192 | 5/1972 | Campbell | 73/336.5 |
| 3,465,591 | 9/1969 | Bachem | 73/17 A |
| 2,554,440 | 5/1951 | Coborn | 73/336.5 |
| 2,684,592 | 7/1954 | Hadady | 73/336.5 |

Primary Examiner—Richard C. Queisser
Assistant Examiner—Denis E. Corr
Attorney, Agent, or Firm—Cushman, Darby & Cushman

[57] ABSTRACT

Vapour pressure of a substance in a quantity of gas, usually water in air, is measured by means of an electrical circuit element, the impedance of which is dependent on the amount of said substance adsorbed in the element. The impedance is sensed by a detecting circuit and any change in impedance controls through said circuit a supply of energy to a heater associated with the element so that the impedance of the element remains substantially constant. The power supplied to the heater is then a measure of the vapour pressure of the said substance.

By measuring the temperature of the electrical circuit element, and of the quantity of gas at a location away from the element by means of suitably selected thermistors the relative humidity of the substance in the gas can be determined.

15 Claims, 6 Drawing Figures

HYGROMETERS

This invention relates to vapour-pressure sensitive devices, more especially for hygrometry, of the kind in which an electrical circuit element changes its electrical properties as a result of changes in the vapour pressure of a substance, usually water, in a quantity of gas with which the electrical circuit element is in contact, and an electrical property of the electrical circuit element is used to provide a measure of the vapour pressure.

Hygrometers have been used in which the vapour-pressure-sensitive element is an anodised layer, ie a layer of aluminum oxide, on a body of aluminium and provided with an overlying porous electrically conducting layer. The electrical impedance measured between the aluminium and the conducting layer varies with the ambient vapour pressure, generally decreasing as the vapour pressure increases. However, such devices have been found to suffer from some disadvantages such as slow response to changes in ambient vapour pressure, hysteresis in conditions of fluctuating vapour pressure, and low sensitivity at high values of vapour pressure, as well as ageing effects which cause loss of calibration accuracy.

The present invention provides a method and apparatus by which a vapour-pressure-sensitive electrical circuit element of the same general character, as mentioned above can be used to measure changes in ambient relative humidity, vapour-pressure and dewpoint, while itself remaining subject to low vapour pressure and undergoing comparatively little change, so substantially reducing the effects of hysteresis, exposure to very high vapour pressure and ageing, which last is largely asoociated with wide fluctuations of vapor pressure.

Apparatus according to the invention comprises an electrical circuit element the impedance of which is sensitive to the ambient vapour pressure of the vapour, control means for supplying electrical energy, to heat the said circuit element, at a rate which is a function of the ambient vapour pressure so that a change in impedance of the said element can be substantially counteracted, and means for indicating the rate of supplying electrical energy to heat said circuit element.

According to a further feature of the invention heating means is provided, in thermal contact with said circuit element, to which electrical energy is supplied by the control means, while means for indicating the rate of supplying electrical energy to said circuit element is a first electrical temperature measuring device for measuring the temperature of said circuit element.

According to a further feature of the invention, a second electrical temperature measuring means is arranged so as to measure the temperature of the vapour at a location away from the electrical circuit element, both temperature measuring means being chosen so that the temperature coefficient thereof thereof is substantially the same as the temperature coefficient of saturation vapour pressure of the vapour, and both temperature measuring means preferably being thermistors.

According to a further feature of the invention, apparatus is provided which comprises a stabilised source of electrical voltage, an amplifier having a high internal gain, eg some hundreds, and an electrical measuring instrument arranged so that the said source of voltage is connected through the first temperature measuring means to an input terminal of the amplifier, the second temperature measuring means is connected from the input terminal of the amplifier to the output terminal thereof and the electrical measuring instrument is connected to the amplifier so as to measure the output thereof, so that the output of the amplifier is a constant multiple of the relative humidity of the vapour in a quantity of gas.

According to a further optional feature of the invention the apparatus comprises an electrical circuit element the impedance of which is sensitive to the ambient vapour pressure of a vapour, control means for supplying electrical energy to the said element so as to maintain the temperature thereof substantially constant and means for measuring the impedance of the electrical circuit element, the impedance being a function of the ambient vapour pressure.

Optionally the electrical circuit element the impedance of which is sensitive to ambient vapour pressure comprises an aluminum body having an anodised layer of aluminium oxide threon and a porous, electrically conducting, corrosion resistant layer on said anodised layer, the impedance of said circuit element being that between the aluminium body and the electrically conductive corrosion resistant layer with the anodised layer as a dielectric.

Optionally the heating means comprises at least a portion of the electrically conducting, corrosion resistant layer, electrical connection desirably being made to the electrical circuit element or to the heating means through clamping rings of copper or copper alloy.

Desirably the characteristic change of impedance of the electrical circuit element with change of vapour pressure is improved in stability by exposure of said circuit element over a period of about 7 days to alternate conditions of high and substantially zero relative humidity, each condition prevailing for a constant period of several minutes at a time, at a temperature considerably in excess of the maximum expected in normal operation, eg at about 80° C.

The principle of operation of the invention is as follows. It is assumed that a vapour-pressure-sensitive element is controlled in temperature, according to the invention, so that its electrical impedance remains substantially constant.

At any temperature, T, the saturation vapour pressure of a vapour in a gas is given by the equation $$Po = A_1 \exp(-b_1/T) \tag{1}$$

where $Po$ is the saturation vapour pressure and $A_1$ and $b_1$ are constants.

If $T_1$ is the temperature of the vapour-pressure-sensitive element required to maintain a substantially constant relative humidity $\rho c$ at the surface of the element then the vapour pressure $p$ at the surface is given by the expression $$p = \rho_c A_1 \exp(-b_1/T_1) \tag{2}$$

So as to measure the temperature $T_1$ of the vapour-pressure-sensitive element a thermometer device having a negative temperature coefficient is used, preferably a thermistor, with a constant voltage across it, so that the current in the thermistor at a temperature T is given by the equation $$I = A_2 \exp(-b_2/T) \quad (3)$$

where I is the current and $A_2$ and $b_2$ are constants. At $T_1$, the temperature of the vapour-pressure-sensitive element, the current is $$I_1 = A_2 \exp(-b_2/T_1) \quad (4)$$

Equations (2) and (4) can be combined to give $$P/I_1 = \rho_c A_1 \exp(-b_1/T_1)/A_2 \exp(-b_2/T_1) \quad (5)$$

If $b_2$ is selected equal to $b_1$ a direct indication of vapour pressure can be obtained from the current $I_1$, since equation (5) then reduces to $$P = \rho_c \cdot I_1 \cdot A_1/A_2 = \text{constant} \times I_1 \quad (6)$$

If the ambient temperature in the gas is $T_a$, then the current in a second thermistor, having a constant voltage across it, is given at that temperature by $I_a = A_3 \exp(-b_3/T_a)$ (7)

and the ambient saturation vapour pressure at temperature $T_a$ is given (cf equation 1) by $$P_a = A_1 \exp(-b_1/T_a) \quad (8)$$

combining equations (6) and (7) gives $$P_a = I_a A_1/A_3 = \text{constant} \times Ia \quad (9)$$

provided $b_3 = b_1$

Combining equations (6) and (9) gives an expression for $\rho_a$, the ambient relative humidity:

$$\rho_a = P/P_a = \rho_c I_1 A_3/I_a A_2 = \text{constant} \times (I_1/I_a) \quad (10)$$

Thus the ambient relative humidity can be expressed as a constant multiple of the ratio between the currents in the two thermistors, or as a constant multiple of the reciprocal ratio between the resistances of the two thermistors.

The simple relationship of equation (10) requires that $b_3 = b_2 = b_1$. The value of $b_1$ for water vapour in air is given by the equation $b_1 = 300 - 0.276 (T - 273) \times 18° K$ (11)

and this is closely approximated by $b_1 = 5,300° K$ at normal temperatures.

However, in manufacturers' data for thermistors the value of the temperature coefficient b is not usually given; instead, the ratio of resistances at 0° C and 50° C is given. At a temperature T the resistance $R_T$ is given by $$1/R_T = A_4 \exp(-b/T) \quad (12)$$

hence $\ln(R_{T_1}/R_{T_2}) = -b(1/T_2 - 1/T_1)$.

Using the value for $b_1$ obtained above from equation (11) one obtains $\ln(R_{T_1}/R_{T_2}) = -5,300 (1/323 - 1/273)$ Hence $R_{T_1}/R_{T_2} = 20.18$ and for the purpose of the invention, applied to the measurement of water vapour pressure and humidity, thermistors having a resistance ratio close to this value must be selected for good results. For example, it is found that if relative humidity measurements are required to be within 6 percent of the true value ie within 6 percent of the magnitude of the relative humidity, the temperature coefficient of the thermistors must be within 10 percent of the temperature coefficient of vapour pressure.

The invention will be further described by way of example only with reference to the accompanying drawings in which FIG. 1 illustrates a device incorporating an electrical circuit element the impedance of which is sensitive to the ambient vapour pressure of the vapour of a volatile substance in a quantity of gas.

Figure 1:
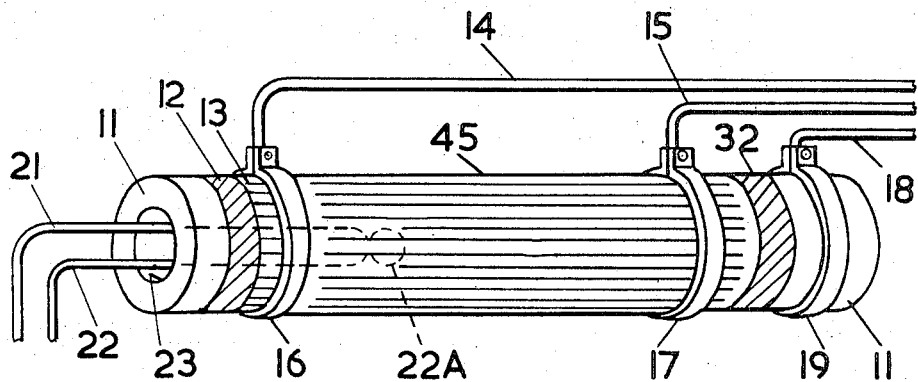

A vapour-pressure-sensitive device incorporating an electrical circuit element the impedance of which is sensitive to ambient vapour pressure is illustrated in FIG. 1. It comprises a cylindrical aluminium tube 11 having a central bore 23. The surface of the tube is provided with an anodic layer of oxide of aluminium 12. This anodic layer is porous and is capable of absorbing water vapour; the impedance of the layer is dependent on the amount of vapour adsorbed. The anodic layer is arranged to act as the dielectric of a capacitor, that is the electrical circuit element the impedance of which is sensitive to the ambient vapour pressure of the vapour of a volatile substance in a quantity of gas. One plate of the capacitor is the tube 11 and the other is an overlying porous film 13 of corrosion-resistant electrically conducting material, in this instance gold. Copper bands 16 and 17 make contact with the conducting film 13 and a third band 19 makes contact with the aluminium tube 11. Electrically conducting leads 14, 15 and 18 are connected to the bands 16, 17 and 19 respectively. Thus between the leads 14 and 15 is connected the resistance 45 of the greater part of the conducting film 13 and between leads 15 and 18 the impedance 32 of the portion of the anodic film lying between the tube 11 and the porous conducting film 13. No damage is caused to the anodic layer by clamping on the contact bands because the layer is very hard, being essentially the same substance as sapphire, and good contact can be established with the conducting film. Further, no difficulty arises from the trapping of moisture under the contact bands, since in use, as already described and further mentioned below, the anodic layer is maintained at a substantially constant moisture content. The temperature of the device is sensed by a thermistor 22A inserted in the bore 23 of the tube, connections to the thermistor being made through electrically conducting leads 21 and 22.

Figure 2:
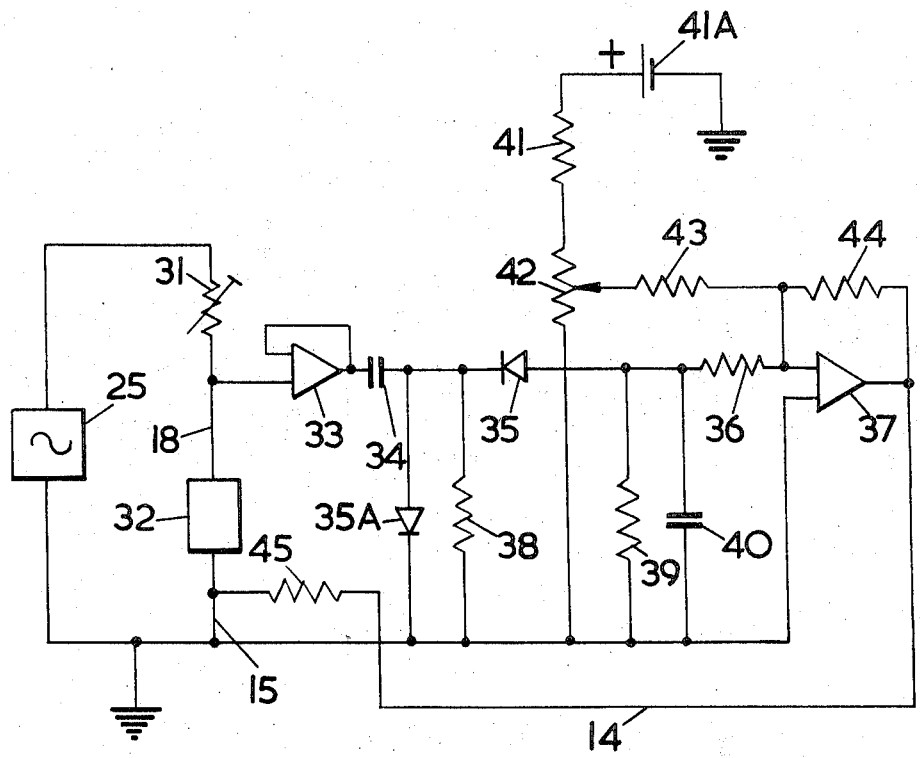
FIG. 2 illustrates diagrammatically an electrical circuit with which the device of FIG. 1 can be combined.

FIG. 2 illustrates the circuit to which the vapour-pressure-sensitive device is connected. The impedance 32 connected between the bands 17 and 19 (FIG. 1) is employed as an electrical circuit element, and its value is dependent upon the vapour pressure of water in the atmosphere in the close vicinity of the device. The impedance is approximated to by a capacitance in parallel with a resistance. Referring to FIG. 2, an oscillator 25 produces a sinusoidal output at 30 Hz, although this frequency is not critical, and the output is applied to the impedance 32 through a pre-adjustable series resistor 31. The voltage signal developed across the impedance 32 is fed to the control means i.e., to an amplifier 33 having unity gain and thence through a capacitor 34, rectifying diode 35 and resistor 36 to the input of a second amplifier 37. The resistor 38 and diode 35A ensure that no direct voltage is generated at the junction between the capacitor 34 and diode 35. The capacitor 40 smooths the input to amplifier 37 and resistor 39 ensures discharge of capacitor 40 when the signal transmitted through the diode 35 decreases. A stabilised source of voltage indicated at 41A is connected to a resistor 41 and a voltage divider 42 in series. The output of the voltage divider is connected through resistor 43 to the input of amplifier 37. The rectifier 35 is so connected that the voltage applied through resistor 36 to the amplifier input is negative while that applied through resistor 43 is positive. Thus a situation can be reached where the net input to amplifier 37 is zero and the output also is zero, or some predetermined datum value. The amplifier 37 is provided with a feedback resistor 44 which is chosen so that the amplifier has a high overall loop gain but remains stable. The load on the output of amplifier 37 is the resistor 45 which is the heating means comprising the portion of porous metal coating on the vapour-pressure-sensitive device between the bands 16 and 17. Alternatively to using the metal coating the resistor 45 may be of the wire wound or other conventional kind and may then conveniently be arranged in the bore 23 (FIG. 1).

With the circuit initially in equilibrium, consider a change in vapour pressure to occur in the vicinity of the vapour-pressure-sensitive device which causes the impedance of the portion 32 of the device to fall, and hence the signal fed to the amplifier 37 through resistor 36 to fall also. The net input to amplifier 37 is thereby increased and consequently the output current through the resistor 45. This increase in current raises the temperature of the vapour-pressure-sensitive device so as substantially to restore the original impedance of the portion 32. The higher the gain of the amplifier 37 the more nearly will the original impedance be restored. The rise in temperature increases the impedance of the device by driving moisture out of the anodic layer.

Figure 3:
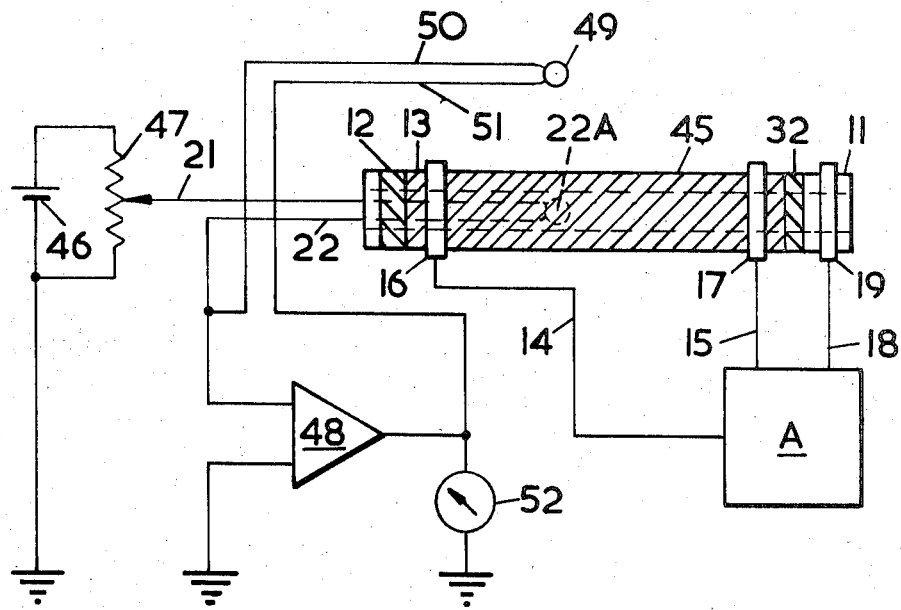
FIG. 3 illustrates diagrammatically apparatus arranged according to the invention so as to enable the relative humidity in a quantity of gas to be measured.

The vapour-pressure-sensitive device can be used, as explained in principle above, to determine the relative humidity of a quantity of gas in which the device is situated. Referring now to FIG. 3, the box A represents the circuit of FIG. 2 with the exception of the components 32 and 45. The thermistor 22A arranged in the bore 23 of the device is fed with a current from a stabilised source 46 through a potential divider 47 and is connected to the input of an operational amplifier 48. A second thermistor 49 is arranged away from the device 11 so that it senses the temperature of the quantity of gas uninfluenced by the heat developed in the portion 45 of the device. The thermistor 49 is connected through electrically conducting leads 50, 51 across the output and input of the amplifier 48 and acts as a feedback resistor.

If the internal gain of the amplifier 48 is high, ie some hudreds, then the overall gain is very closely approximated by the ratio of $R_2/R_1$ where $R_2$ is the resistance of thermistor 49 (the feed-back resistor) and $R_1$ that of thermistor 22A (the input resistor) and for a given input the output of the amplifier as measured by the meter 52 is given by:

constant $x$ gain = constant $x$ $(R_2/R_1)$ = output

As explained above with reference to equation 10 the relative humidity of the quantity of gas can be expressed as a constant multiple of the ratio between the resistance of the two thermistors provided these latter are chosen to possess appropriate characteristics. Thus the indication of meter 52 is a constant multiple of the relative humidity, $\rho_a$, of the quantity of gas, and the constant may be determined by exposing the vapour-pressure-sensitive device to a quantity of gas the relative humidity of which is predetermined in known manner.

Figure 4:
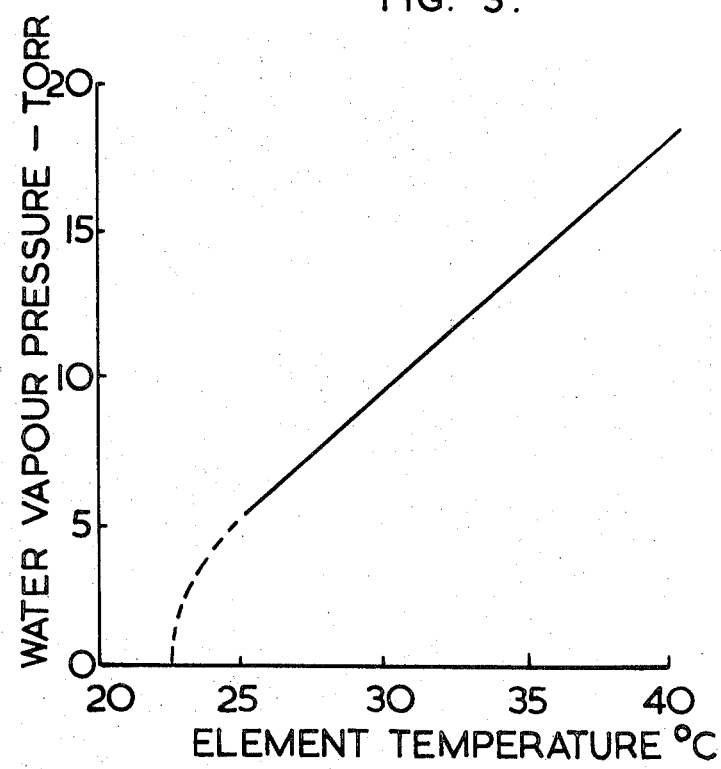
FIG. 4 is a graph of water vapour pressure against the temperature of a vapour-pressure-sensitive electrical circuit element.

FIG. 4 shows by way of example a typical relationship between water vapour pressure in air and the temperature attained by the device 11, when the latter is heated to such an extent as to maintain the impedance at a value corresponding to the near-dry state. With the aid of such a graph a simple measurement of the temperature as indicated by thermistor 22A allows the water vapour pressure to be determined. Since the greater, and most generally useful, part of the graph is virtually linear, calibration is simple and only two points on the graph need be determined experimentally. The equilibrium value of the impedance of portion 32 of the device 11 can be set by adjustment of the resistance 31 or of the potentiometer 42 (FIG. 2).

Figure 5:
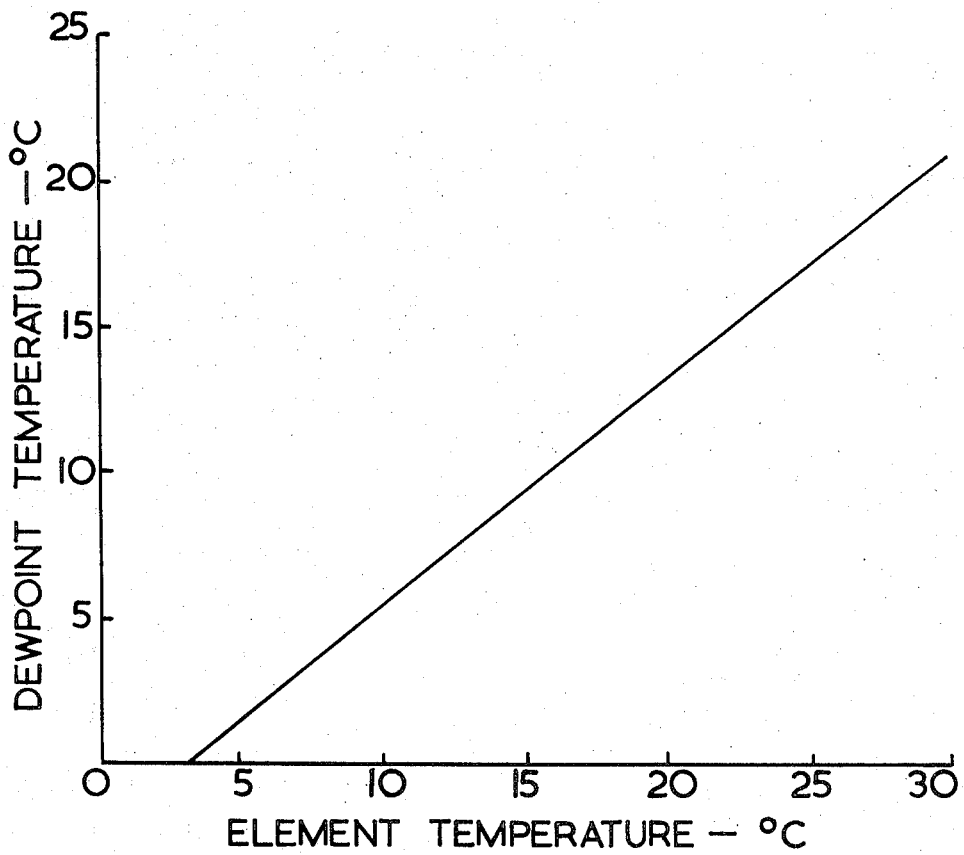
FIG. 5 is a graph of dew point temperature against the temperature of a vapour-pressure-sensitive electrical circuit element.

FIG. 5 shows by way of example a typical relationship between dew point and the temperature attained by the device 11 with the impedance maintained at about one third of the value corresponding to dry conditions. Again, being linear, the relationship is relatively simple to determine.

It is an important feature of the vapour-pressure-sensitive electrical circuit element described that its characteristic change of impedance with change of vapour pressure alters gradually over a long period of time. Suitable treatment can accelerate this process so that the characteristic is substantially stabilised after a relatively short time. A method which has been found effective consists of maintaining the device at a temperature considerably in excess of the maximum expected in normal operation while continually alternating the relative humidity to which the device is exposed between a high and a low value. By way of example, a device maintained at a constant temperature of 80° C while the relative humidity is alternated between 80° percent and close to 0 percent with 3 minutes in each condition for a total period of one week achieves a degree of stability which without such treatment it would achieve only in the course of about 12 years.

The anodic layer of aluminum oxide which is produced in the construction of the vapour-pressure-sensitive device may be formed, for example, by immersing the aluminium tube, which is the basis of the device, in a 17 percent volume/volume solution of sulphuric acid and anodising it at a direct current density of about 40 milliamperes per square centimetre of anode surface for 30 minutes at a temperature not exceeding 30° C. A conducting, porous layer of gold may be formed on the anodic layer by vacuum evaporation at a pressure of not more than $10^{-4}$ torr.

Figure 6:
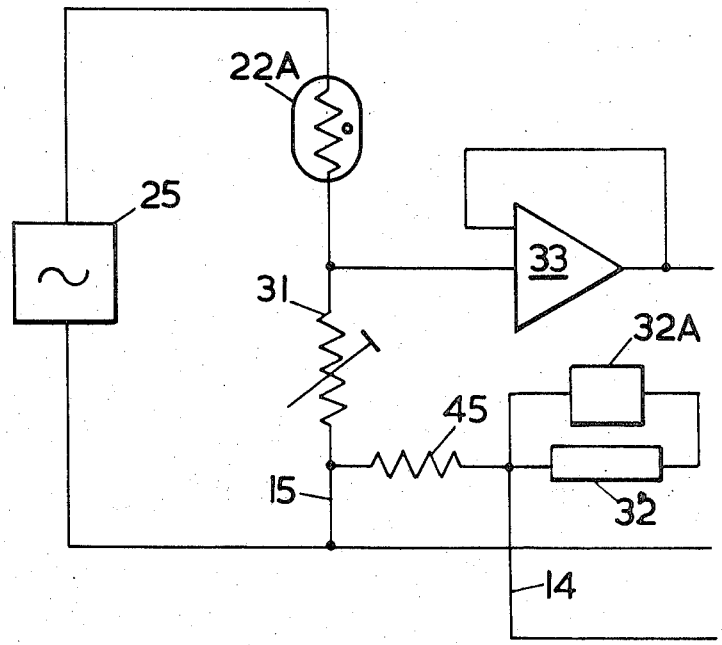
FIG. 6 illustrates diagrammatically a portion of the electrical circuit of FIG. 2 modified according to an optional feature of the invention.

The invention has been described with reference to means for maintaining a constant impedance 32. An operational mode of operation may be found desirable with relative humidities of 50 percent and lower. With this mode the device can also be operated at sub-zero temperatures and is capable of detecting changes of dewpoint in the region of $-100°C$ and below. It is then found desirable to employ the thermistor 22A as a thermostatic element for maintaining the device 11, and hence the impedance 32, at a substantially constant temperature above that of the surroundings, the circuit of FIG. 2 being modified in part as illustrated in FIG. 6. The impedance 32 is found to be related reproducibly to the vapour pressure in its surroundings and the impedance is measured by conventional means 32A such as the AC bridge.

Referring to FIG. 6 the modification to the electrical circuit comprises connecting the variable impedance 31 between earth and the input to the amplifier 33 and connecting the thermistor 22A between the oscillator 25 and the input to the amplifier 33. As before, the temperature of the device 11 is maintained by dissipation of heat in the resistor 45.

The maintenance of constant temperature in the device 11 in conditions of very low dewpoint provides improved stability of calibration of impedance 32 as a function of relative humidity.

We claim:

1. Apparatus comprising an electrical circuit element the impedance of which is sensitive to the ambient vapour pressure of a vapour, control means for supplying electrical energy to heat the said circuit element at a rate which is a function of the ambient vapour pressure so that a change in impedance of the said element can be substantially counteracted, a first electrical temperature measuring means for measuring the temperature of said electrical circuit element, and a second electrical temperature measuring means arranged so as to measure the temperature of the vapour at a location away from the said electrical circuit element, both temperature measuring means being chosen so that each of the temperature coefficients thereof is substantially the same as the temperature coefficient of saturation vapour pressure of the vapour.

2. Apparatus according to claim 1 comprising a stabilised source of electrical voltage, an amplifier having a high internal gain, and an electrical measuring instrument, arranged so that the said source of voltage is connected through the first temperature measuring means to an input terminal of the amplifier, the second temperature measuring means is connected from the input terminal of the amplifier to the output terminal thereof and the electrical measuring instrument is connected to the amplifier so as to measure the output thereof, so that the output of the amplifier is a constant multiple of the relative humidity of the vapour in a quantity of gas.

3. Apparatus according to claim 1 having heating means in thermal contact with said circuit element and to which electrical energy is supplied by the control means.

4. Apparatus according to claim 1 in which the electrical circuit element the impedance of which is sensitive to ambient vapour pressure comprises an aluminium body having an anodised layer of aluminium oxide thereon and a porous, electrically conducting, corrosion resistant layer on said anodised layer, the impedance of said circuit element being that between the aluminum body and the electrically conducting corrosion resistant layer with the anodised layer as a dielectric.

5. Apparatus according to claim 4 having heating means which comprises at least a portion of the electrically conducting, corrosion resistant layer.

6. Apparatus according to claim 5 in which electrical connection is made to at least one of the electrical circuit element and the heating means through clamping rings made of one of the substances copper and copper alloy.

7. Apparatus according to claim 1 in which any electrical temperature measuring means is a thermistor.

8. Apparatus according to claim 1 in which the electrical circuit element has been treated by exposure of said element over a period of about 7 days to alternate conditions of high and substantially zero relative humidity, said conditions prevailing for a constant period of several minutes at a time, at a temperature considerably in excess of the maximum expected in normal operation.

9. Apparatus comprising an electrical circuit element the impedance of which is sensitive to the ambient vapour pressure of a vapour, control means for supplying electrical energy to the said element so as to maintain the temperature thereof substantially constant and means for measuring the impedance of the electrical circuit element, the impedance of the said electrical circuit element being a function of the ambient vapour pressure.

10. Apparatus according to claim 9 having heating means in thermal contact with said circuit element and to which electrical energy is supplied by the control means.

11. Apparatus according to claim 9 in which the electrical circuit element the impedance of which is sensitive to ambient vapour pressure comprises an aluminium body having an anodised layer of aluminium oxide thereon and a porous, electrically conducting, corrosion resistant layer on said anodised layer, the impedance of said circuit element being that between the aluminium body and the electrically conducting corrosion resistant layer with the anodised layer as a dielectric.

12. Apparatus according to claim 11 having heating means which comprises at least a portion of the electrically conducting, corrosion resistant layer.

13. Apparatus according to claim 12 in which electrical connection is made to at least one of the electrical circuit element and the heating means through clamping rings made of one of the substances copper and consisting of copper alloy.

14. Apparatus according to claim 9 in which said control means includes a thermistor which operates as an electrical temperature measuring means for measuring the temperature of the electrical element.

15. Apparatus according to claim 9 in which the electrical circuit element has been treated by exposure of said element over a period of about 7 days to alternate conditions of high and substantially zero relative humidity, each condition prevailing for a constant period of several minutes at a time, at a temperature considerably in excess of the maximum expected in normal operation.

* * * * *